US008588046B2

(12) United States Patent
Nishiwaki et al.

(10) Patent No.: US 8,588,046 B2
(45) Date of Patent: Nov. 19, 2013

(54) INFORMATION RECORDING DEVICE AND INFORMATION REPRODUCING DEVICE

(75) Inventors: Seiji Nishiwaki, Hyogo (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 12/440,393

(22) PCT Filed: Aug. 22, 2007

(86) PCT No.: PCT/JP2007/066224
§ 371 (c)(1),
(2), (4) Date: Mar. 6, 2009

(87) PCT Pub. No.: WO2008/029614
PCT Pub. Date: Mar. 13, 2008

(65) Prior Publication Data
US 2009/0268583 A1    Oct. 29, 2009

(30) Foreign Application Priority Data
Sep. 7, 2006    (JP) .................................. 2006-242440

(51) Int. Cl.
*G11B 7/00*    (2006.01)
(52) U.S. Cl.
USPC ........................................................ 369/103
(58) Field of Classification Search
None
See application file for complete search history.

(56) References Cited

U.S. PATENT DOCUMENTS

| | | | |
|---|---|---|---|
| 5,539,718 A * | 7/1996 | Hoshi et al. ................... 369/100 |
| 5,930,220 A * | 7/1999 | Shimano et al. ............ 369/44.23 |
| 6,034,939 A * | 3/2000 | Takasawa et al. ........ 369/112.17 |
| 6,167,017 A | 12/2000 | Higashiura et al. |
| 7,414,786 B2 * | 8/2008 | Brown et al. ............ 359/490.01 |
| 7,630,110 B2 * | 12/2009 | Horikoshi et al. ................. 359/9 |
| 2002/0181343 A1 | 12/2002 | Hayashi et al. |
| 2003/0053395 A1 | 3/2003 | Kadowaki et al. |
| 2005/0237896 A1* | 10/2005 | Tachibana et al. ............ 369/103 |
| 2006/0268669 A1* | 11/2006 | Kaji et al. .................. 369/44.11 |

FOREIGN PATENT DOCUMENTS

| | | |
|---|---|---|
| CN | 1208223 A | 2/1999 |
| EP | 1 065 658 | 1/2001 |
| JP | 8-31006 | 2/1996 |
| JP | 11-311938 | 11/1999 |
| JP | 2001-273635 | 10/2001 |
| JP | 2003-67949 | 3/2003 |
| JP | 2003-162832 | 6/2003 |

* cited by examiner

*Primary Examiner* — Joseph Feild
*Assistant Examiner* — Parul Gupta
(74) *Attorney, Agent, or Firm* — Hamre, Schumann, Mueller & Larson, P.C.

(57) ABSTRACT

An information recording/reproducing device includes a radiation light source 1 such as a semiconductor laser, a spatial modulation element 6 that splits laser light 2 emitted from the radiation light source 1 into a large number of diffracted light rays, and an objective lens 7 that converges the large number of diffracted light rays onto different points. The laser light 2 emitted from the radiation light source 1 is split into a large number of diffracted light rays by the spatial modulation element 6, the large number of diffracted light rays are converged onto different points in the photosensitive layer 8b of the information recording medium 8 by the objective lens 7, and information is recorded in the photosensitive layer 8b of the information recording medium 8, using an assembly of these converging points. Accordingly, it is possible to provide an information recording device capable of realizing high-contrast recording in which stray light or diffraction has no influence during signal recording.

14 Claims, 6 Drawing Sheets

INFORMATION RECORDING DEVICE AND INFORMATION REPRODUCING DEVICE

TECHNICAL FIELD

The present invention relates to an information recording device for recording a recording signal in an information recording medium, and an information reproducing device for reproducing a recording signal recorded in an information recording medium.

BACKGROUND ART

An information recording/reproducing device disclosed in Patent document 1 is known as an example of conventional information recording/reproducing devices of this sort. Here, a description is given with reference to FIGS. 5 and 6 based on this conventional example, with some modifications applied thereto.

FIG. 5 is a diagram showing a portion of the cross-sectional structure of an information recording/reproducing device and the state of ray bundles inside the information recording medium during signal recording, according to the conventional art.

As shown in FIG. 5, P-polarized laser light emitted from a radiation light source such as a semiconductor laser is converged by a collimating lens into parallel light, which then is split into two components by a half mirror. One of the two components split by the half mirror is transmitted through a half-wave plate to become S-polarized light 2a (the state of light described thus far is not shown in FIG. 5, but the proceeding state is shown by broken lines), and is transmitted successively through a spatial modulation element 17 and a convex lens 4' to become light with weak convergence, which then enters a polarizing beam splitter 5'. The light 2a incident on the polarizing beam splitter 5' is reflected at a plane of polarization 5a' of the polarizing beam splitter 5', and is transmitted through a joint gyrator 18. The light 2a then is converged by the objective lens 7 into a ray bundle 20a that is converged onto a point $P_b$ located before a reflection plane 8S of the information recording medium 8. At the point $P_b$, the ray bundle 20a moves to the opposite side of an optical axis L.

The joint gyrator 18 is formed by bonding together two optical rotators consisting of two regions that are divided on a plane passing through the optical axis L and perpendicular to the plane of FIG. 5. The upper half region 18a causes the direction of polarization of transmitted light to rotate clockwise by 45°, and the lower half region 18b causes the direction of polarization of transmitted light to rotate counterclockwise by 45°.

The other light 2b of the P-polarized laser light that has been emitted from the radiation light source, has been converged by the collimating lens into parallel light, and then has been split into two components by the half mirror (the state of the light described thus far is not shown in FIG. 5, but the proceeding state is shown by solid lines) is transmitted successively through the plane of polarization 5a' of the polarizing beam splitter 5' and the joint gyrator 18 along the optical axis L, and then converged by the objective lens 7 into a ray bundle 20b that is converged onto the point $P_0$ on the reflection plane 8S of the information recording medium 8.

The information recording medium 8 is made up of a transparent layer 8a, a transparent substrate 8c, and a photosensitive layer 8b such as a photopolymer interposed therebetween. The converging point $P_0$ and the converging point $P_b$ are formed approximately symmetrically with respect to the photosensitive layer 8b.

The spatial modulation element 17 may be constituted, for example, by a ferroelectric liquid crystal panel, and the region thereof through which the light 2a is transmitted is divided into a grid pattern. Each divided portion of the region individually is subjected to a phase shift of π (phase modulation), or to a change in the transmittance to zero (amplitude modulation). This modulation pattern is updated based on an external signal.

As can be seen clearly from FIG. 5, the ray bundle 20a and the ray bundle 20b intersect in the photosensitive layer 8b region of the information recording medium 8. A ray 2B, which passes through a circle 19, of the ray bundle 20b is rotated counterclockwise by 45° with respect to the P-polarized light by the region 18b of the joint gyrator 18, and a ray 2A, which passes through the circle 19, of the ray bundle 20a is rotated clockwise by 45° with respect to the S-polarized light by the region 18a of the joint gyrator 18. As a result, the directions of polarization of the rays 2A and 2B coincide in the circle 19. This relationship also applies to rays passing through a circle located opposite to the circle 19 across the optical axis L. Since the directions of polarization of the ray bundles 20a and 20b thus coincide in the photosensitive layer 8b region, the ray bundles 20a and 20b interfere with each other, thereby forming interference fringes. When the output of the radiation light source such as a semiconductor laser is large, the photosensitive layer 8b is exposed by the ray bundles 20a and 20b, thus forming an exposed pattern 21 (a pattern in which the refractive index is varied in correspondence with the light intensity distribution of the interference fringes). This exposed pattern 21 corresponds to the modulation pattern of the spatial modulation element 17 (i.e., different exposed patterns 21 are recorded depending on the modulation pattern of the spatial modulation element 17).

The information recording medium 8 is attached to a motor, and is rotated by the rotation of that motor. On the surface of the reflection plane 8S, guide grooves (gratings) having a periodicity in the radius direction are formed with an equal pitch along the direction of rotation.

The converging point $P_0$ of the ray bundle 20b is located on the guide grooves, and moves along the guide grooves with the rotation of the information recording medium 8. After being reflected at the reflection plane 8S, the ray bundle 20b is transmitted through the information recording medium 8, and converted into parallel light by the objective lens 7. The light whose direction of polarization has been rotated clockwise by 45° by being transmitted through the region 18a of the joint gyrator 18 in the incoming path is transmitted through the region 18b of the joint gyrator 18 in the outgoing path, and its direction of polarization thus is returned to the original direction. Similarly, the light whose direction of polarization has been rotated counterclockwise by 45° by being transmitted through the region 18b of the joint gyrator 18 in the incoming path is transmitted through region 18a of the joint gyrator 18 in the outgoing path, and its direction of polarization thus is returned to the original direction. As a result, the return light from the ray bundle 20b is restored to P-polarized light by being transmitted through the joint gyrator 18. After being transmitted through the plane of polarization 5a' of the polarizing beam splitter 5', the P-polarized light is guided to the photodetector side by a splitting means such as a hologram (this is not shown in FIG. 5). Then, a focus error signal for the reflection plane 8S and a tracking error signal for the guide grooves are generated by a detection signal from the photodetector, and the objective lens 7 is driven based on these signals such that the converging point of the ray bundle 20b is controlled so as to be located on the guide grooves on the reflection plane 8S.

FIG. 6 is a diagram showing a portion of the cross-sectional structure of an information recording/reproducing device and the state of ray bundles inside the information recording medium during signal reproduction, according to the conventional art. FIG. 6 is different from FIG. 5 in the modulation pattern of the spatial modulation element 17.

As shown in FIG. 6, P-polarized laser light emitted from the radiation light source is converged by the collimating lens into parallel light, which then is split into two components by the half mirror. Light 2b', which is one of the two components split by the half mirror (the state of the light described thus far is not shown in FIG. 6, but the proceeding state is shown by solid lines) is transmitted successively through the plane of polarization 5a' of the polarizing beam splitter 5' and the joint gyrator 18 along the optical axis L, and its directions of polarization are rotated clockwise and counterclockwise by 45° respectively by the regions 18a and 18b of the joint gyrator 18. Thereafter, the light 2b' is converged by the objective lens 7 onto the point $P_0$ located on the reflection plane 8S of the information recording medium 8. The ray (reflected light) 2B' reflected at the reflection plane 8S propagates through the circle 19 in the exposed pattern 21, and, thus, becomes a ray bundle 20a', which produces diffracted light 2A. After being converged onto the point $P_b$, the diffracted light 2A' moves to the opposite side of the optical axis L. The diffracted light 2A' is converted into light with weak divergence by the objective lens 7, and its polarization state is changed by the joint gyrator 18. Since the polarization state of the diffracted light 2A' is the same as that of the reflected light 2B', and the P-polarized light is transmitted through the region 18a of the joint gyrator 18 in the incoming path, the diffracted light 2A' is rotated clockwise by 45° with respect to the P-polarized light. On the other hand, the diffracted light produced by the propagation through a circle located opposite to the circle 19 across the optical axis L is rotated counterclockwise by 45° with respect to the P-polarized light. When these diffracted light rays have been transmitted through the joint gyrator 18, their directions of polarization are rotated clockwise and counterclockwise by 45° respectively by the regions 18a and 18b of the joint gyrator 18. As a result, the ray bundle 20a' is converted into an S-polarized ray bundle. Accordingly, the ray bundle 20a' is reflected at the plane of polarization 5a' of the polarizing beam splitter 5', converted into parallel light by the convex lens 4, and then is transmitted through the spatial modulation element 17. As described above, the spatial modulation element 17 includes a ferroelectric liquid crystal panel or the like, and during signal reproduction, allows the transmitted light to be transmitted therethrough, without applying modulation, based on an external signal. The light 2a', which has been transmitted through the spatial modulation element 17, is in accordance with the recording signal of the exposed pattern 21, so that the modulation pattern of the spatial modulation element 17 during signal recording is reproduced as a light intensity distribution pattern of the light 2a'. The transmitted light 2a' is branched from the incoming optical path by a hologram, a half mirror, or the like, and converged by a collimating lens so as to be guided to the photodetector. Then, a signal light is detected by photodetection cells in the form of grids corresponding to the pattern of division of the spatial modulation element 17, and, thereby, the recording signal is reproduced.

On the other hand, the component 20b', which has not been diffracted by propagating through the exposed pattern 21 region, is transmitted through the information recording medium 8, and then converted into parallel light by the objective lens 7. The light whose direction of polarization has been rotated clockwise by 45° by being transmitted through the region 18a of the joint gyrator 18 in the incoming path is transmitted through the region 18b of the joint gyrator 18 in the outgoing path, and its direction of polarization thus is returned to the original direction. Similarly, the light whose direction of polarization has been rotated counterclockwise by 45° by being transmitted through the region 18b of the joint gyrator 18 in the incoming path is transmitted through region 18a of the joint gyrator 18 in the outgoing path, and its direction of polarization thus is returned to the original direction. As a result, the reflected ray bundle 20b' is restored to P-polarized light by being transmitted through the joint gyrator 18. After being transmitted through the plane of polarization 5a' of the polarizing beam splitter 5', the P-polarized light is guided to the photodetector side by a splitting means such as a hologram. Then, a focus error signal for the reflection plane 8S and a tracking error signal for the guide grooves are generated by a detection signal from the photodetector, and the objective lens 7 is driven based on these signals such that the converging point $P_0$ of the convergent light is controlled so as to be located on the guide grooves on the reflection plane 8S.

Patent document 1: JP H11-311938A

DISCLOSURE OF INVENTION

Problem to be Solved by the Invention

The above-described conventional information recording/reproducing device has the following problems.

First, the following problem occurs during signal recording. Specifically, in FIG. 5, a portion of each of the reflected ray bundles from the reflection plane 8S of the information recording medium 8 for the ray bundle 20a and the ray bundle 20b is transmitted through over the exposed pattern 21 region. These reflected ray bundles constitute stray light at the time of forming the exposed pattern 21, thereby causing a large amount of noise in the recorded state. Furthermore, the light 2a, which has been transmitted through the spatial modulation element 17, has undergone a periodic change in phase or amplitude, and, therefore, is susceptible to diffraction. The resulting diffracted light is separated away from the transmitted light (zero-order diffracted light) in proportion to the distance between the spatial modulation element 17 and the exposed pattern 21. If this separation is too large, the diffracted light will deviate from the exposed pattern 21 region. Since the zero-order diffracted light does not contain any signal information generated by the spatial modulation element 17, the exposed pattern 21 with few diffracted light components contains little signal information, resulting in a low contrast signal when reproduced.

Furthermore, the following problem occurs during signal reproduction. Specifically, in FIG. 6, a reproduced image of a recording signal is reflected on the spatial modulation element 17. Since the reproduction signal photodetector is disposed at a position distant from the spatial modulation element 17, diffraction occurs during propagation of light from the spatial modulation element 17 to the photodetector and the diffracted light rays overlap one another, thus causing a severe deterioration in the quality of the reproduced image.

The present invention was made in order to solve the above-described problems of the conventional art, and it is an object of the present invention to provide an information recording device capable of realizing high-contrast recording in which stray light or diffraction has no influence during signal recording, and an information reproducing device capable of achieving a significant improvement in the signal quality on the photodetection plane during signal reproduction.

Means for Solving Problem

In order to achieve the above-described object, an information recording device according to the present invention includes: a light source; a diffraction means that splits light emitted from the light source into a large number of diffracted light rays; and a converging means that converges the large number of diffracted light rays onto different points. Light emitted from the light source is split into a large number of diffracted light rays by the diffraction means, the large number of diffracted light rays are converged by the converging means onto different points in a photosensitive layer of an information recording medium, and information is recorded in the photosensitive layer of the information recording medium, using a set of these converging points.

Furthermore, an information reproducing device according to the present invention includes: a light source; a converging means that converges light emitted from the light source; and a signal detector including an assembly of microscopic photodetection cells. Light emitted from the light source is transmitted through a photosensitive layer of an information recording medium to be converged onto a reflection plane of the information recording medium by the converging means, and reflected at the reflection plane to be transmitted through the photosensitive layer again; transmission through the photosensitive layer in an incoming path and an outgoing path causes diffracted reproduction light to travel toward the converging means; and the diffracted reproduction light enters the signal detector via the converging means, and information of the photosensitive layer is reproduced using the photodetection cells.

In the above-described information recording device of the present invention, it is preferable that a surface of the diffraction means includes an assembly of microscopic regions, the microscopic regions individually rise and descend in accordance with an electric signal input to the diffraction means to form an uneven surface, and the phase of light reflected at the uneven surface is spatially modulated to generate a large number of diffracted light rays. In this case, it is preferable that the information recording device further includes a signal detector including an assembly of microscopic photodetection cells. A first light distribution of a first interference pattern is calculated, the first interference pattern being obtained by causing equal-intensity light illuminating the centers of a portion of the photodetection cells, light that is emitted from the light source and converged by the converging means onto a reflection plane of the information recording medium, and light that is reflected at the reflection plane to interfere with each other in the photosensitive layer, under a condition that light reflected at the diffraction means is not diffracted; and a region including the interference pattern is divided with microscopic elements having the same size, an amount of light included in the microscopic elements is calculated, n microscopic elements are extracted in descending order of amount of light, a light distribution of a second interference pattern is calculated, the second interference pattern being obtained by causing n light rays being emitted from the centers of the microscopic elements with a light intensity obtained by dividing the amount of light included in the microscopic elements by the volume of the microscopic elements and light emitted from the light source to interfere with each other on the surface of the diffraction means, and an unevenness distribution of the surface of the diffraction means is determined based on the light distribution of the second interference pattern. In this case, it is also preferable that the photodetection cells are classified into two different regions, in one of which the emission points disposed at the photodetection cells have a phase of 0, and in the other of which said emission points have a phase of $\pi$, and these two different regions are disposed in an alternating manner, and that the light rays being emitted from the centers of the microscopic elements are in phase. In this case, it is also preferable that the light distributions of the first and second interference patterns are calculated successively, while changing combinations of the photodetection cells serving as an origin of the emitted light, to determine an unevenness distribution of the surface of the diffraction means, the unevenness distribution is stored in a memory, the unevenness distribution is read from the memory during signal recording, and the phase of light reflected at the uneven surface is spatially modulated.

Furthermore, in the above-described information recording device of the present invention, it is preferable that the diffraction means includes an assembly of microscopic regions, refractive indices in the microscopic regions individually change in accordance with an electric signal input to the diffraction means, and the phase of light transmitted through the microscopic regions is spatially modulated to generate a large number of diffracted light rays. In this case, it is preferable that the information recording device further includes a signal detector including an assembly of microscopic photodetection cells. A first light distribution of a first interference pattern is calculated, the first interference pattern being obtained by causing equal-intensity light illuminating the centers of a portion of the photodetection cells, light that is emitted from the light source and converged by the converging means onto a reflection plane of the information recording medium, and light that is reflected at the reflection plane to interfere with each other in the photosensitive layer, under a condition that light transmitted through the diffraction means is not diffracted; and a region including the interference pattern is divided with microscopic elements having the same size, an amount of light included in the microscopic elements is calculated, n microscopic elements are extracted in descending order of amount of light, a light distribution of a second interference pattern is calculated, the second interference pattern being obtained by causing n light rays being emitted from the centers of the microscopic elements with a light intensity obtained by dividing the amount of light included in the microscopic elements by the volume of the microscopic elements and light emitted from the light source to interfere with each other on the surface of the diffraction means, and a refractive index distribution of the diffraction means is determined based on the light distribution of the second interference pattern. In this case, it is also preferable that the photodetection cells are classified into two different regions, in one of which the emission points disposed at the photodetection cells have a phase of 0, and in the other of which said emission points have a phase of $\pi$, and these two different regions are disposed in an alternating manner, and that the light rays being emitted from the centers of the microscopic elements are in phase. In this case, it is also preferable that the light distributions of the first and second interference patterns are calculated successively, while changing combinations of the photodetection cells serving as an origin of the emitted light, to determine a refractive index distribution of the diffraction means, the refractive index distribution is stored in a memory, the refractive index distribution is read from the memory during signal recording, and the phase of light transmitted through the microscopic regions is spatially modulated.

Effects of the Invention

According to the present invention, recording in the photosensitive layer can be performed so as to obtain an optimum reproduced image of a recording signal, and, therefore, it is possible to eliminate recording signal reading errors. Moreover, the signal density can be increased due to reduced recording signal reading errors, so that it is possible to realize a large capacity memory.

BRIEF DESCRIPTION OF DRAWINGS

FIG. 1 is a diagram showing the cross-sectional structure of an information recording/reproducing device and the state of ray bundles inside the information recording medium during signal recording, according to an embodiment of the present invention.

[FIG. 2] FIGS. 2A to 2C show the configuration of a spatial modulation element of an information recording/reproducing device during signal recording, according to an embodiment of the present invention: wherein FIG. 2A is a plan view showing a reflection plane of the spatial modulation element; FIG. 2B is a cross-sectional view of the spatial modulation element; and FIG. 2C is a schematic diagram showing an operation state of actuators constituting the spatial modulation element.

FIG. 3 is a diagram showing the cross-sectional structure of an information recording/reproducing device and the state of ray bundles inside the information recording medium during signal reproduction, according to an embodiment of the present invention.

FIG. 4 is a plan view showing the detection plane of a signal reproduction photodetector (signal detector) of an information recording/reproducing device according to an embodiment of the present invention.

FIG. 5 is a diagram showing a portion of the cross-sectional structure of an information recording/reproducing device and the state of ray bundles inside the information recording medium during signal recording, according to the conventional art.

FIG. 6 is a diagram showing a portion of the cross-sectional structure of an information recording/reproducing device and the state of ray bundles inside the information recording medium during signal reproduction, according to the conventional art.

DESCRIPTION OF THE INVENTION

Figure 1:
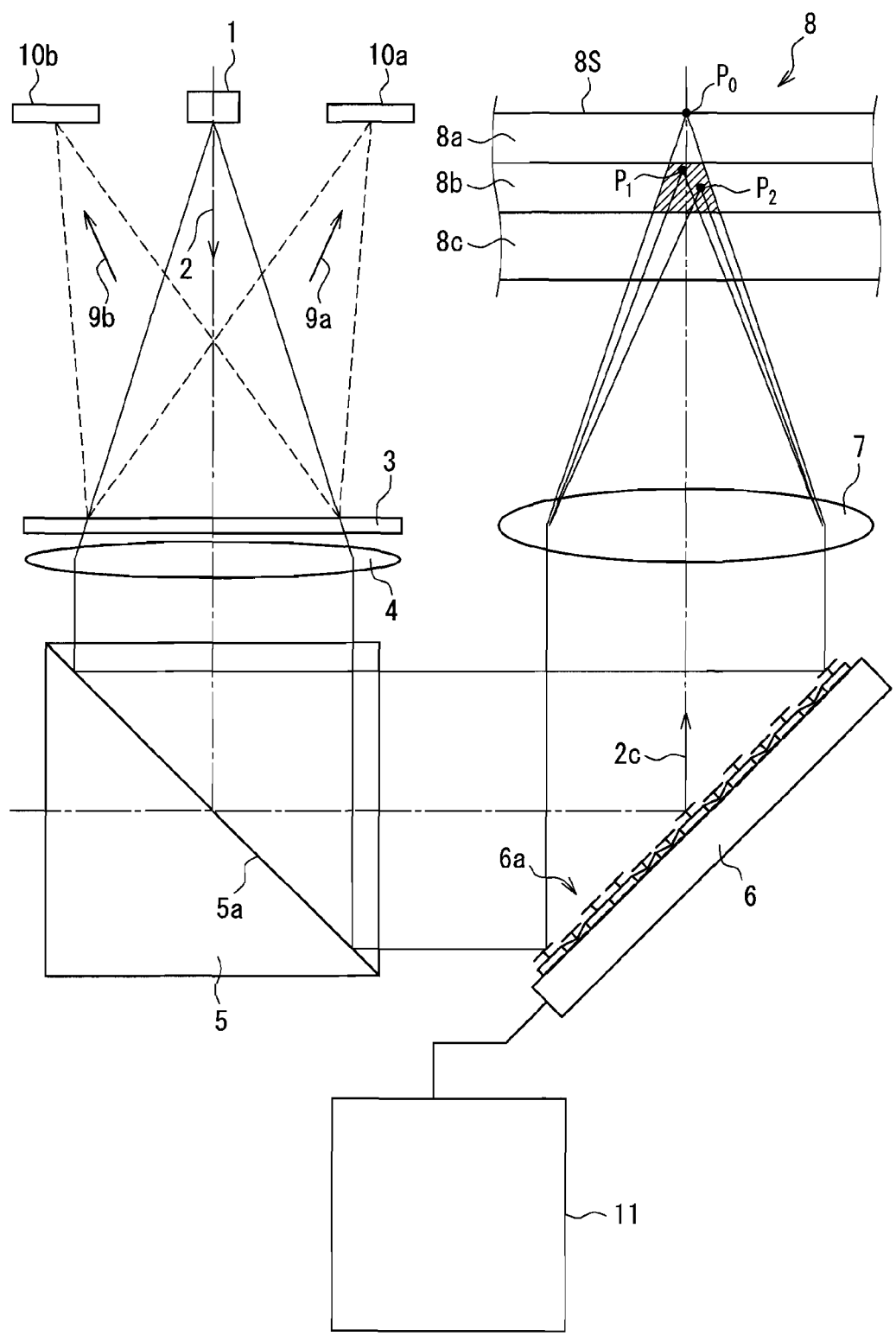
[FIG. 1]

Hereinafter, embodiments of the present invention will be described with reference to FIGS. 1 to 4. It should be noted that the same elements that constitute the information recording/reproducing device according to the conventional art are denoted by the same reference numerals.

FIG. 1 is a diagram showing the cross-sectional structure of an information recording/reproducing device and the state of ray bundles inside the information recording medium during signal recording, according to an embodiment of the present invention.

As shown in FIG. 1, the information recording/reproducing device of this embodiment includes a radiation light source 1 such as a semiconductor laser, a spatial modulation element 6 serving as a diffraction means that splits laser light 2 with a wavelength λ that has been emitted from the radiation light source 1 into a large number of diffracted light rays, and an objective lens 7 serving as a converging means that converges the large number of diffracted light rays to different points.

The information recording/reproducing device of this embodiment also includes a collimating lens 4 that converts the laser light 2 emitted from the radiation light source 1 into parallel light, a half mirror 5 that reflects the parallel light toward the spatial modulation element 6, photodetectors 10a and 10b, and a hologram 3 that splits return light into +1st order diffracted light 9a and −1st order diffracted light 9b and causes them to enter the photodetectors 10a and 10b, respectively.

A reflection plane 6a of the spatial modulation element 6 includes an assembly of microscopic actuators formed by a semiconductor process, and individual actuators are displaced vertically (in the direction of the normal of the reflection plane 6a) based on a control signal (electric signal) from a controller 11.

The information recording medium 8 is made up of a transparent layer 8a, a transparent substrate 8c, and a photosensitive layer 8b, such as a photopolymer, disposed therebetween. A reflective film is formed on the transparent layer 8a to provide a reflection plane 8S. Here, guide grooves or guide pits are formed on the reflection plane 8S of the information recording medium 8.

The laser light 2 emitted from the radiation light source 1 is transmitted through the hologram 3, and converged by the collimating lens 4 into parallel light, which is then reflected at a mirror surface 5a of the half mirror 5. The light that has been reflected at the mirror surface 5a of the half mirror 5 is reflected at the reflection plane 6a of the spatial modulation element 6 to become light 2c, which then is converged by the objective lens 7 onto a point $P_0$ on the reflection plane 8S of the information recording medium 8. The light that has been reflected at the reflection plane 8S passes through the objective lens 7, the reflection plane 6a of the spatial modulation element 6, and the mirror surface 5a of the half mirror 5, and converged by the collimating lens 4. The light that has been converged by the collimating lens 4 is split by the hologram 3 into +1st order diffracted light 9a and −1st order diffracted light 9b, which then enter the photodetectors 10a and 10b, respectively. A focus error signal for the reflection plane 8S and a tracking error signal for the guide grooves or guide pits are generated from the photodetectors 10a and 10b. Then, the objective lens 7 is driven based on these signals such that a defocus or off-track situation will not occur at the converging spots on the reflection plane 8S.

By displacement of the individual actuators of the spatial modulation element 6, the light reflected at the reflection plane 6a of the spatial modulation element 6 is split into a large number of diffracted light rays, and these large numbers of diffracted light rays are converged by the objective lens 7 onto n points, namely, points $P_1, P_2, \ldots, P_n$ within the photosensitive layer 8b located before the reflection plane 8S. Consequently, a specific interference pattern is formed in the photosensitive layer 8b. "n" may be, for example, about 100000 to 1000000. The photosensitive layer 8b is exposed in accordance with the intensity distribution of this interference pattern, and the refractive index is varied according to the light intensity. That is, a recording signal (information) is recorded in the photosensitive layer 8b of the information recording medium 8, using a set of the converging points $P_1, P_2, \ldots, P_n$.

Here, each of the converging points $P_1, P_2, \ldots, P_n$ is a point present within a cone (a quadrangular pyramid when the opening of the objective lens 7 has the shape of a square) that is formed by zero-order diffracted light (light travelling toward the converging point $P_0$).

Figure 2A:
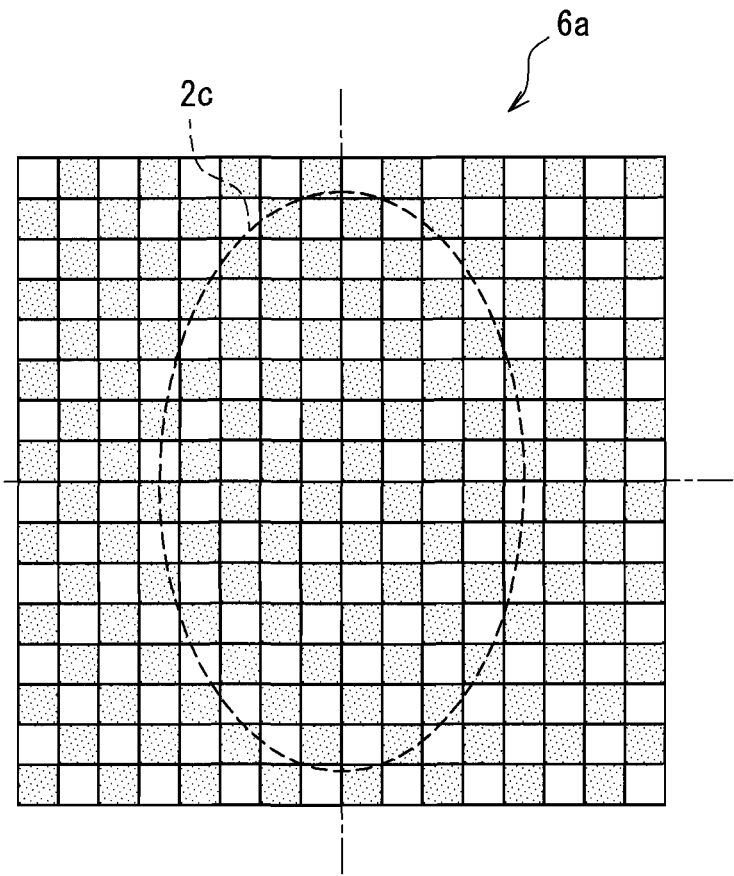
Figure 2B:
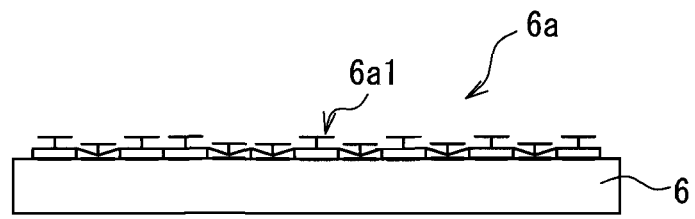
Figure 2C:
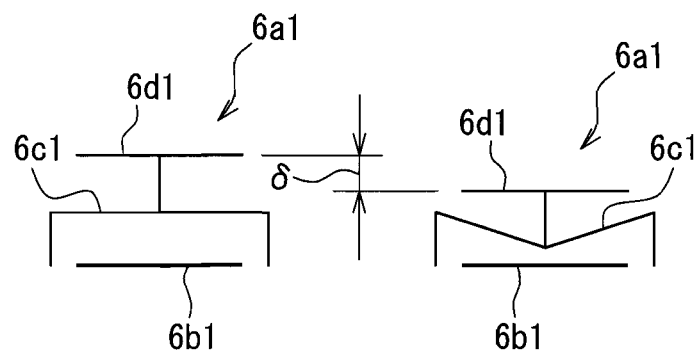

FIGS. 2A to 2C show the configuration of a spatial modulation element of an information recording/reproducing device during signal recording, according to this embodiment: wherein FIG. 2A is a plan view showing a reflection plane of the spatial modulation element; FIG. 2B is a cross-sectional view of the spatial modulation element; and FIG. 2C is a schematic diagram showing an operation state of actuators constituting the spatial modulation element.

As shown in FIGS. 2A and 2B, the reflection plane 6a of the spatial modulation element 6 is divided into microscopic regions (mirrors 6d1 of actuators 6a1 shown in FIGS. 2B and 2C) in a grid pattern (which may be alternatively a pattern of polygons such as hexagons), and each one of the microscopic regions in the form of grids forms a reflection plane that is parallel to the plane of FIGS. 2A to 2C. Here, the reflection plane 6a of the spatial modulation element 6 is filled with a large number of the actuators 6a1 without any gaps. Then, each one of the microscopic regions in the form of grids separately rises and descends in the direction of the normal of the plane of FIG. 2A in accordance with a control signal from the controller 11 (see FIG. 1), thereby forming an uneven surface (FIG. 2B). Consequently, the light 2c reflected at the reflection plane 6a is spatially phase-modulated, and is split into a large number of diffracted light rays.

As shown in FIG. 2C, each of the actuators 6a1 is made up of a mirror 6d1, and electrode plate 6b1 and 6c1, and the mirror 6d1 is connected to the electrode plate 6c1. The electrode plate 6c1 is bent by a Coulomb force resulting from the electric charges supplied to the electrode plates 6b1 and 6c1, and, thereby, the mirror 6d1 descends by a maximum displacement amount δ (the right drawing in FIG. 2C). The right drawing in FIG. 2C shows the case where electric charges of opposite polarities are supplied to the electrode plates 6b1 and 6c1 so that the electrode plates 6b1 and 6c1 are attracted to each other. If electric charges of the same polarity are supplied to the electrode plates 6b1 and 6c1, then the mirror 6d1 rises by a displacement amount δ. When the angle formed by the normal of the reflection plane 6a of the spatial modulation element 6 and the optical axis of incident light is taken as θ, and the wavelength of the laser light 2 as λ, it is sufficient that the displacement amount δ of the mirror 6d1 is $\lambda \cos\theta$ or greater, and all the phases ($-\pi$ to $\pi$) of the reflected light can be expressed by an increase or a decrease of ±δ.

Figure 3:
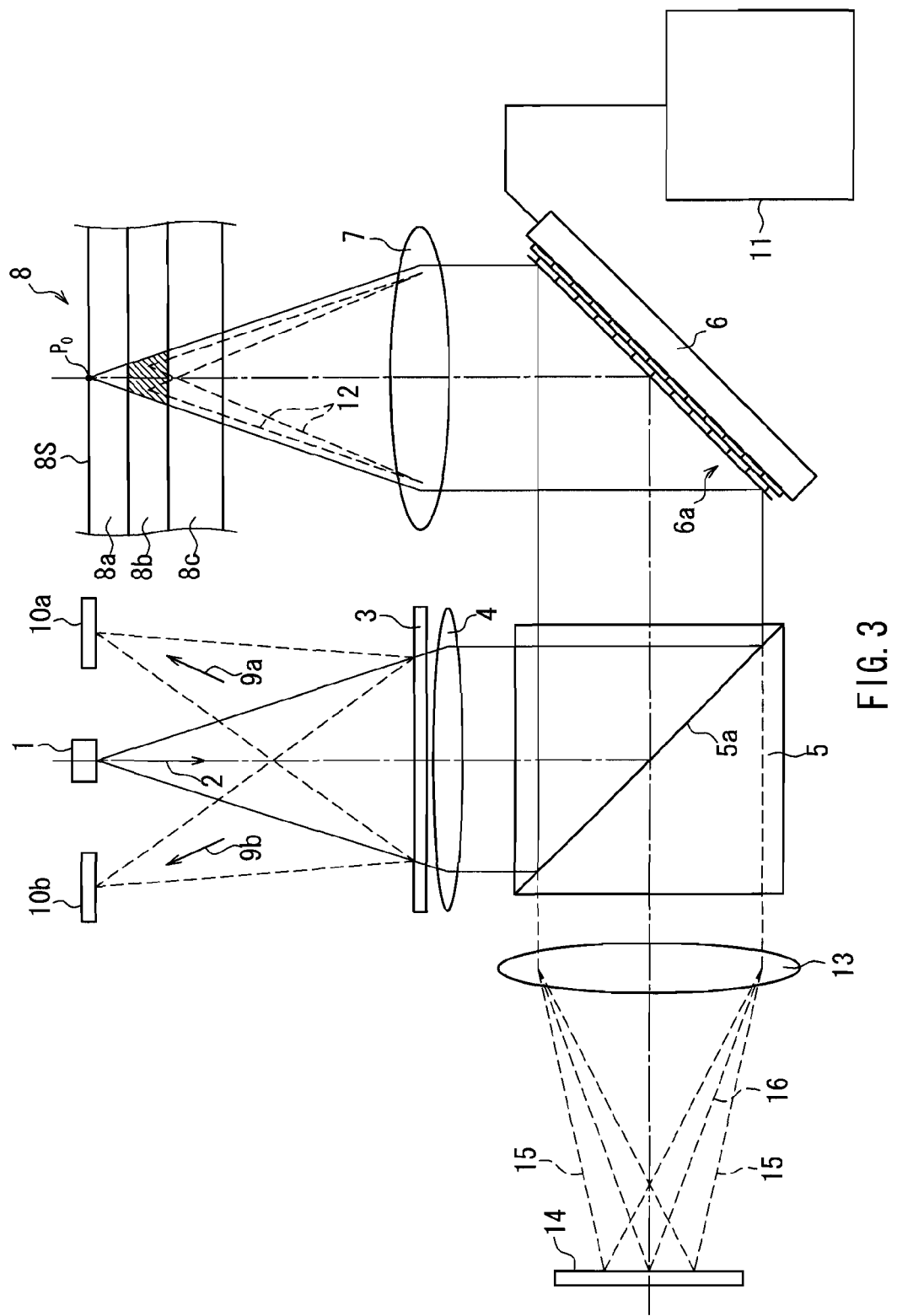
[FIG. 3]

FIG. 3 is a diagram showing the cross-sectional structure of an information recording/reproducing device and the state of ray bundles inside the information recording medium during signal reproduction, according to this embodiment.

As shown in FIG. 3, the information recording/reproducing device of this embodiment further includes a signal reproduction photodetector 14 serving as a signal detector, and a collimating lens 13 that converges return light that has been transmitted through the mirror surface 5a of the half mirror 5 onto the signal reproduction photodetector 14. The rest of the configuration is the same as that of the information recording/reproducing device shown in FIG. 1. Therefore, components that are the same as those shown in FIG. 1 are denoted by the same reference numerals, and the description thereof has been omitted.

The laser light 2 emitted from the radiation light source 1 is transmitted through the hologram 3, and converged by the collimating lens 4 into parallel light, which then is reflected at the mirror surface 5a of the half mirror 5. The light that has been reflected at the mirror surface 5a of the half mirror 5 is reflected at the reflection plane 6a of the spatial modulation element 6, converged by the objective lens 7, is transmitted through the photosensitive layer 8b of the information recording medium 8 (transmission in the incoming path), and converged onto the point $P_0$ on the reflection plane 8S of the information recording medium 8. The light that has been reflected at the reflection plane 8S is transmitted through the photosensitive layer 8b again (transmission in the outgoing path), passes through the objective lens 7, the reflection plane 6a of the spatial modulation element 6, and the mirror surface 5a of the half mirror 5, and converged by the collimating lens 4. The light that has been converged by the collimating lens 4 is split by the hologram 3 into +1st order diffracted light 9a and −1st order diffracted light 9b, which then enter the photodetectors 10a and 10b, respectively. A focus error signal for the reflection plane 8S and a tracking error signal for the guide grooves or guide pits are generated from the photodetectors 10a and 10b. Then, the objective lens 7 is driven based on these signals such that defocus or off-track will not occur at the converging points on the reflection plane 8S. The individual actuators on the spatial modulation element 6 form a mirror surface (a state in which the displacement amount of the mirrors 6d1 of all the actuators is zero) in accordance with a control signal from the controller 11, and light, therefore, will not be diffracted by reflection at the reflection plane 6a of the spatial modulation element 6. Further, the photosensitive layer 8b is recorded, and the laser light 2 traveling back and forth through the photosensitive layer 8b (transmission through the photosensitive layer 8b in the incoming path and the outgoing path) generates diffracted light (diffracted reproduction light) 12 traveling toward the objective lens 7 side. Then, the diffracted light 12 is transmitted through the mirror surface 5a of the half mirror 5 via the objective lens 7 and the reflection plane 6a of the spatial modulation element 6, and then converged by the collimating lens 13 to become a group of light rays 15 converged at various locations on the signal reproduction photodetector 14. Here, those components that are transmitted directly through the photosensitive layer 8b without being diffracted are converged by the collimating lens 13, and thus become light 16 converged in the vicinity of the center of the signal reproduction photodetector 14.

Figure 4:
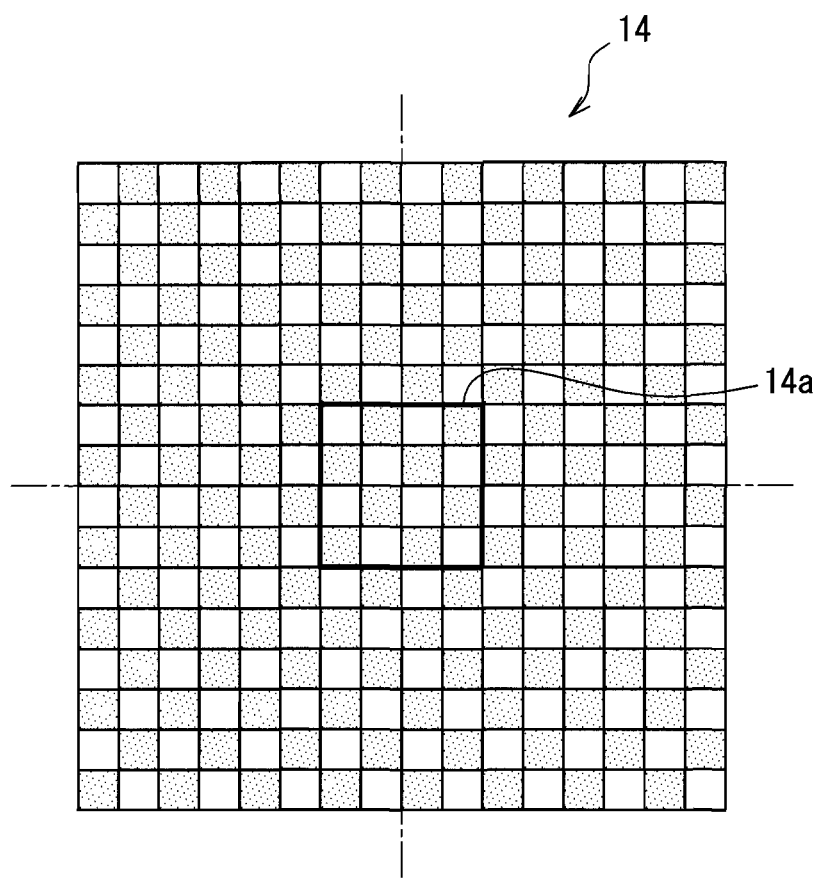
[FIG. 4]
Figure 5:
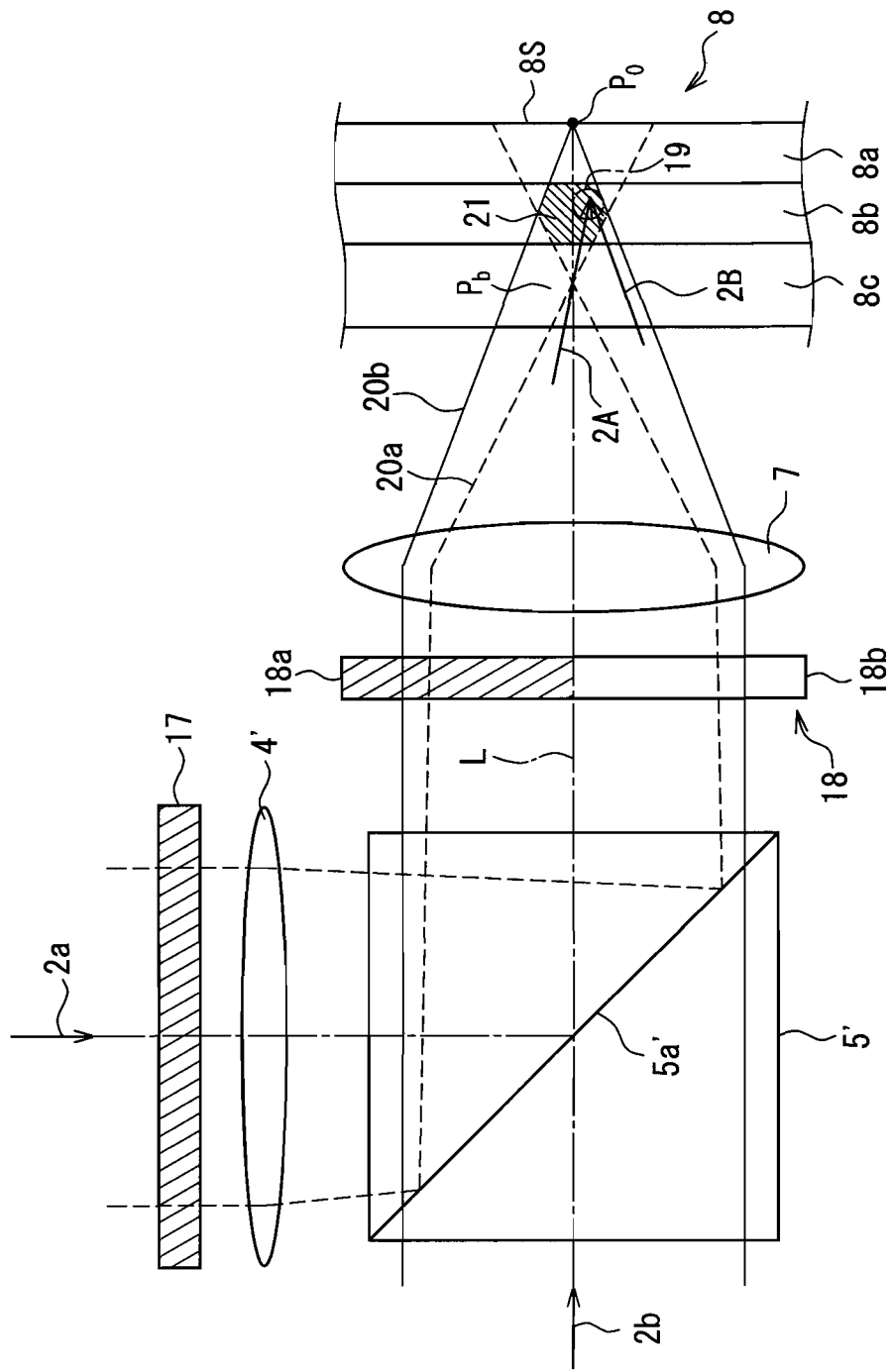
[FIG. 5]
Figure 6:
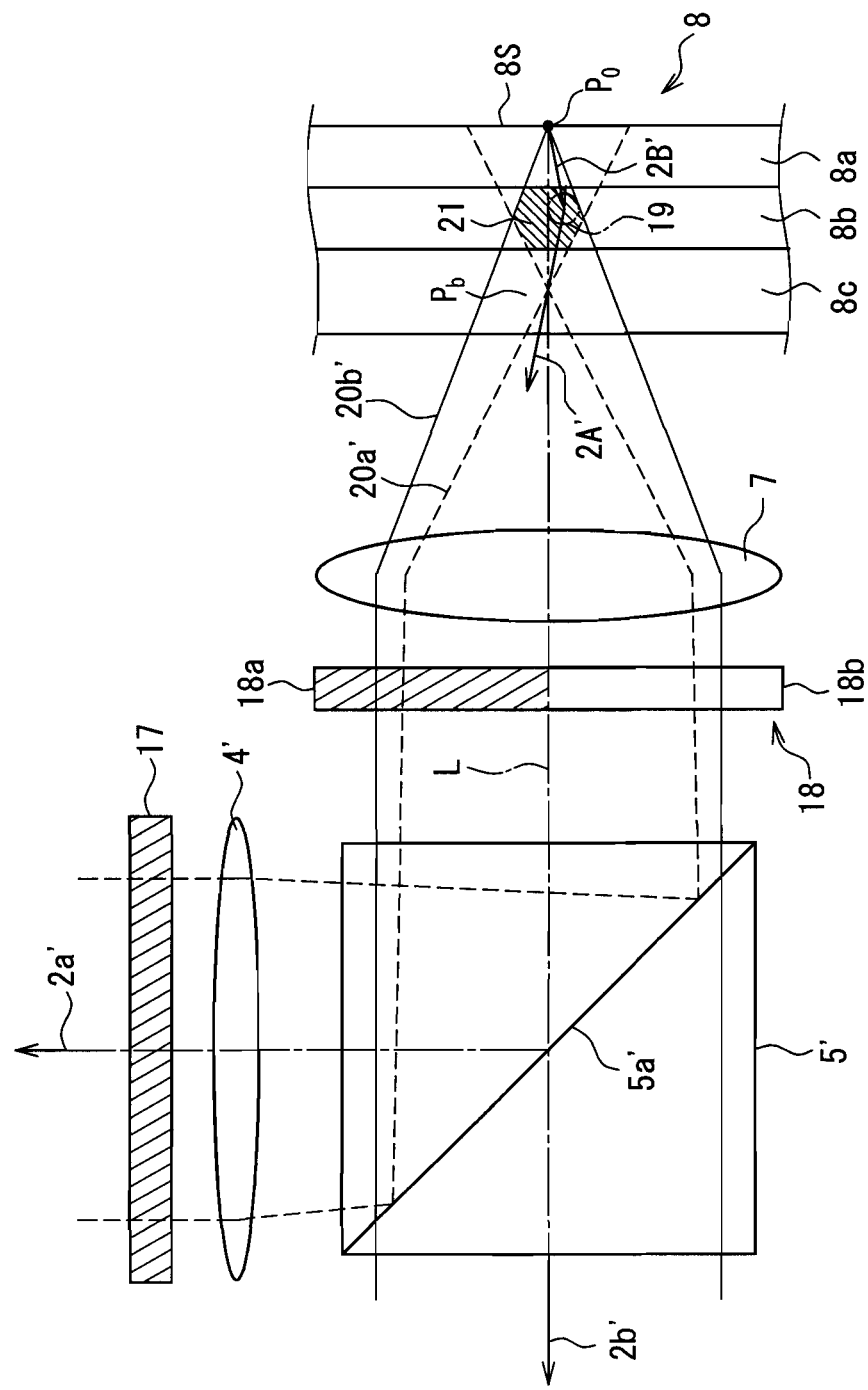
[FIG. 6]

FIG. 4 is a plan view showing the detection plane of a signal reproduction photodetector of the information recording/reproducing device according to this embodiment.

As shown in FIG. 4, the detection plane of the signal reproduction photodetector 14 is divided into microscopic photodetection cells forming a grid pattern, the group of light rays 15 are converged in the vicinity of the centers of their respective photodetection cells, and the amount of light is individually detected. By assigning signal "1" to a detected amount of light exceeding a certain level, and assigning signal "0" to a detected amount of light not exceeding that level, it is possible to reproduce a recording signal recorded in the photosensitive layer 8b as page data. Note that the light 16, which is converged in the vicinity of the center of the signal reproduction photodetector 14, is a component that is not diffracted at the photosensitive layer 8b, and contains no recording signal, and, therefore, a region 14a located in the vicinity of the center of the detection plane of the signal reproduction photodetector 14 is excluded from the signal reproduction region. The number of photodetection cells included in the signal reproduction region, from which the region 14a in the vicinity of the center is excluded, is set to N.

The actuator displacement information for the spatial modulation element 6 determined by a control signal from the controller 11 is determined in the following manner. From among the photodetection cells constituting the signal reproduction region in the signal reproduction photodetector 14 other than the region 14a in the vicinity of the center, those assigned with signal "1" are selected, and emission points (wavelength λ) having a certain amount of light (amount of light P) and being in phase with each other are disposed at the centers of the selected photodetection cells. On the other hand, taking the reflectance of the mirror surface 5a of the half mirror 5 as R and the transmittance as T, an emission point (wavelength λ) having an amount of light N×P×T/R is disposed at the radiation light source 1 (N×P×T/R is merely a guide, and the amount of light may be a value in the range of one-third to three times the value of N×P×T/R). In the optical configuration shown in FIG. 3 (in a state in which the reflection plane 6a of the spatial modulation element 6 forms a mirror surface), light is emitted simultaneously from these emission points, and the light distribution of an interference pattern formed in the photosensitive layer 8b of the information recording medium 8 is calculated based on a wave equation (wave calculation), using a model that includes the reflection from the reflection plane 8S of the information recording medium 8. As the wave equation, the Fresnel-Kirchhoff diffraction formula expressed by Formula 1 below can be used.

$$U(P) = -\frac{iA}{2\lambda} \int \int_s \frac{e^{jk(r+s)}}{rs} [\cos(n, r) - \cos(n, s)] dS$$

In Formula 1 above, U(P) is the complex amplitude at a point P, A is a constant, λ is the wavelength of light, k is a wave number 2π/λ, r in the denominator is the distance between an emission point and a point on an aperture plane, s in the denominator is the distance between the point on the aperture plane and the point P, r in cos (n, r) is the direction vector of a light ray traveling from the emission point to the aperture plane, s in cos (n, s) is a direction vector of a light ray traveling from the aperture plane toward the point P, n in cos (n, r) and cos (n, s) means the normal vector of the aperture plane, and cos (n, r) and cos (n, s) are the direction cosines formed by the two vectors in the parentheses.

The interference pattern obtained by the above-described calculation is expressed as an intensity distribution, and the interior of a circular truncated cone formed by an overlap between the ray bundle travelling towards the converging point $P_0$ and the photosensitive layer 8b is divided into rectangular solids having the same size. The amounts of light within the rectangular solids are calculated, n rectangular solids are extracted in descending order of amount of light, and the three dimensional position of the center of each of the rectangular solids is calculated. Note that the shape of the rectangular solids is similar to a shape that is approximately circumscribed about an ellipsoid that is the three-dimensional intensity distribution of a light spot where light is converged by the objective lens 7 with no aberration. Emission points (wavelength λ) having the same phase are disposed at the centers of the n rectangular solids, and the amounts of light of the emission points are made equal to the amounts of light included in their corresponding rectangular solids (i.e., Light intensity of emission point=Amount of light included in rectangular solid÷Volume of rectangular solid). An emission point (wavelength λ) having an amount of light N×P×T/R (where R is the reflectance of the mirror surface 5a of the half mirror 5 and T is the transmittance) is disposed at the radiation light source 1 (N×P×T/R is merely a guide, and the amount of light may be a value in the range of one-third to three times the value of N×P×T/R), light is simultaneously emitted from these emission points, and the light distribution of an interference pattern formed on the reflection plane 6a of the spatial modulation element 6 is calculated based on the above-described wave equation (wave calculation). Then, a phase distribution is calculated from this interference pattern. This phase distribution will give actuator displacement information for the spatial modulation element 6. For example, when the phase at the position of an actuator is taken as φ (radian) and the angle formed by the normal of the reflection plane 6a and the optical axis of the incident light is taken as θ, it is sufficient that the displacement amount δ of the mirror 6d1 of the actuator is φλ cos θ/4π, and a control signal is sent to the spatial modulation element 6 so as to satisfy this condition.

There is a maximum of $2^N$ combinations of assignments for the signals "0" and "1" at the photodetection cells. An interference pattern formed in the photosensitive layer 8b is calculated in advance using the wave calculation as described above for all of these combinations. Furthermore, actuator displacement information for the spatial modulation element 6 for reproducing the interference pattern is calculated in advance using the wave calculation as described above. Then, this actuator displacement information is stored in a memory as a table, in association with a recording signal. During signal recording, a recording signal is written in the photosensitive layer 8b, while reading the actuator displacement information from the memory. Although the wave calculation requires a large amount of time for second order integral calculation, it is possible to perform recording during signal recording at a speed corresponding to the readout speed, by performing the calculation and storing the results thereof in the memory in advance. The memory readout speed, or in other words, the data transmission rate for connection between a personal computer and a memory already has reached several Gbps, and assuming that the data transmission rate is 5 Gbps, the information recording/reproducing device according to this embodiment can realize a speed 1000 times as high as that of a DVD recording/reproducing device, provided that the photosensitive layer 8b has a sufficient photospeed. Note that an actuator formed by a semiconductor process exhibits a response of several kHz, and assuming that the response is 5 kHz, it is necessary to obtain a recording signal corresponding to page data of N=1000×1000 in order to realize a data transmission rate of 5 Gbps.

Since recording in the photosensitive layer 8b is performed such that an ideal light spot (reproduction light) is projected onto the photodetection cells during signal reproduction, taking into consideration all the disturbances that exert an influence, such as the influence of reflection from the reflection plane 8S during signal reproduction, almost no recording signal reading errors occur. Furthermore, even if the structure of the information recording medium (the thickness or refractive index of each layer, the specifications of the grooves of the reflection plane, the refractive indices of the photosensitive layer before and after recording, or the like) is changed, simply recalculating the actuator displacement information for the new structure of the information recording medium, and storing the results in a memory as a table make it possible to perform recording/reproduction optimized for that information recording medium.

In this embodiment, the spatial modulation element 6 whose reflection plane 6a includes an assembly of the microscopic actuators formed by a semiconductor process is described as an example of the diffraction means that splits light emitted from the light source into a large number of diffracted light rays. However, it is possible to use a diffraction means that has another configuration, as long as it can change the phase distribution of the light.

Although the phase distribution of light is changed by reflection in this embodiment, it is possible to adopt a configuration in which the phase distribution of light is changed by transmission. For example, it is possible to use a method in which a liquid crystal layer is interposed between two substrates facing each other, and the orientation of the liquid crystal molecules are changed by application of an electric field generated by the electrodes on the surface of the substrates, thereby controlling the refractive index of the liquid crystal layer to change the phase distribution of transmitted light.

In this embodiment, emission points having the same amount of light and being in phase with each other are disposed at the centers of the selected photodetection cells when determining the actuator displacement information for the spatial modulation element 6. However, it is possible to set another phase condition. For example, it is possible to set a phase condition that photodetection cells that form a grid pattern are temporarily divided into two regions, namely, white and black regions, that form a checkered pattern, and a phase difference of $\pi$ is caused between the emission points disposed at the photodetection cells in the white region and the emission points disposed at the photodetection cells in the black region. With this condition, the phases of adjacent emission points are always shifted by $\pi$, so that the phases of two neighboring light spots that are projected onto the photodetection cells during signal reproduction also are shifted by $\pi$. Accordingly, the two light spots are clearly separated since the intensity is zero at the middle point therebetween, resulting in a higher contrast in the reproduction light.

In this embodiment, emission points having the same phase are disposed at the centers of n rectangular solids in the photosensitive layer 8b. However, the emission points may not necessarily have the same phase, and it is possible to set another phase condition as long as the light distribution resulting from the n emission points is similar to the light distribution of the interference pattern formed in the photosensitive layer 8b.

Further, the shape of the photodetection cells constituting the signal reproduction region of the signal reproduction photodetector 14 may not be a square, and may be, for example, a polygon such as a hexagon.

Similarly, the rectangular solids that divide the interior of a truncated cone formed by an overlap between the ray bundle traveling toward the converging point $P_0$ and the photosensitive layer 8b may have a shape other than a rectangular solid, including, for example, a polygonal column such as a hexagonal column.

The light intensity distribution in the photosensitive layer 8b and the actuator displacement information for the spatial modulation element 6 are determined by wave calculation in this embodiment. However, according to a feature of the present invention, the light intensity distribution in the photosensitive layer is controlled so as to obtain an optimal reproduced image on a signal detection plane, and it is possible to use a method other than that described above to determine these pieces of information (the light intensity distribution in the photosensitive layer 8b and the actuator displacement information for the spatial modulation element 6), as long as such a feature can be achieved.

Furthermore, although the ray bundles in the area from the objective lens 7 to the information recording medium 8 are substantially rotationally symmetrical in this embodiment, it is possible to adopt a configuration in which these ray bundles are made rotationally asymmetrical, for example, by making them obliquely incident on the reflection plane 8S of the information recording medium 8, or a configuration in which these ray bundles are transmitted through rather than reflected at the reflection plane 8S. In these cases, the incoming optical path and the outgoing optical path are different, so that it is necessary to provide optical components such as an objective lens separately.

Industrial Applicability

The present invention is applicable to an information recording device for recording a recording signal in an information recording medium, and an information reproducing device for reproducing a recording signal recorded in an information recording medium.

The invention claimed is:

1. An information recording device, comprising:
   a light source;
   a diffraction element that splits light emitted from the light source into a large number of diffracted light rays; and
   a converging element that converges the large number of diffracted light rays onto different converging points,
   wherein light emitted from the light source is split into a large number of diffracted light rays by the diffraction element, the large number of diffracted light rays are converged by the converging element onto different converging points at three dimensional positions in a photosensitive layer of an information recording medium, a specific interference pattern is formed in the photosensitive layer of the information recording medium by using a set of the converging points, the photosensitive layer is exposed in accordance with the intensity distribution of the interference pattern, and the refractive index of the photosensitive layer is varied according to the light intensity, thereby recording information in the photosensitive layer of the information recording medium.

2. An information reproducing device for reproducing information recorded in a photosensitive layer of an information recording medium, comprising:
   a light source;
   a converging element that converges light emitted from the light source; and
   a signal detector comprising an assembly of microscopic photodetection cells,
   wherein the information has been recorded in the photosensitive layer of the information recording medium due to a variation in the refractive index according to the light intensity distribution of a specific interference pattern formed by using a set of converging points converged at three-dimensional positions,
   light emitted from the light source is transmitted through the photosensitive layer of the information recording medium to be converged onto a reflection plane of the information recording medium by the converging element, and reflected at the reflection plane to be transmitted through the photosensitive layer again;
   transmission through the photosensitive layer in an incoming path and an outgoing path causes diffracted reproduction light to travel toward the converging element; and the diffracted reproduction light enters the signal detector via the converging element, and information of the photosensitive layer is reproduced using the photodetection cells.

3. The information recording device according to claim 1, wherein a surface of the diffraction element comprises an assembly of microscopic regions, the microscopic regions individually rise and descend in accordance with an electric signal input to the diffraction element to form an uneven surface, and the phase of light reflected at the uneven surface is spatially modulated to generate a large number of diffracted light rays.

4. The information recording device according to claim 1, wherein the diffraction element comprises an assembly of microscopic regions, refractive indices in the microscopic regions individually change in accordance with an electric signal input to the diffraction element, and the phase of light transmitted through the microscopic regions is spatially modulated to generate a large number of diffracted light rays.

5. The information recording device according to claim 3, further comprising a signal detector comprising an assembly of microscopic photodetection cells, wherein a first light distribution of a first interference pattern is calculated, the first interference pattern being obtained by causing equal-intensity light illuminating the centers of a portion of the photodetection cells, light that is emitted from the light source and converged by the converging element onto a reflection plane of the information recording medium, and light that is reflected at the reflection plane to interfere with each other in the photosensitive layer, under a condition that light reflected at the diffraction element is not diffracted; and a region comprising the interference pattern is divided with microscopic elements having the same size, an amount of light included in the microscopic elements is calculated, n microscopic elements are extracted in descending order of amount of light, a light distribution of a second interference pattern is calculated, the second interference pattern being obtained by causing n light rays being emitted from the centers of the microscopic elements with a light intensity obtained by dividing the amount of light included in the microscopic elements by the volume of the microscopic elements and light emitted from the light source to interfere with each other on the surface of the diffraction element, and an unevenness distribution of the surface of the diffraction element is determined based on the light distribution of the second interference pattern.

6. The information recording device according to claim 4, further comprising a signal detector comprising an assembly of microscopic photodetection cells, wherein a first light distribution of a first interference pattern is calculated, the first interference pattern being obtained by causing equal-intensity light illuminating the centers of a portion of the photodetection cells, light that is emitted from the light source and converged by the converging element onto a reflection plane of the information recording medium, and light that is reflected at the reflection plane to interfere with each other in the photosensitive layer, under a condition that light transmitted through the diffraction element is not diffracted; and a region comprising the interference pattern is divided with microscopic elements having the same size, an amount of light included in the microscopic elements is calculated, n microscopic elements are extracted in descending order of amount of light, a light distribution of a second interference pattern is calculated, the second interference pattern being obtained by causing n light rays being emitted from the centers of the microscopic elements with a light intensity obtained by dividing the amount of light included in the microscopic elements by the volume of the microscopic elements and light emitted from the light source to interfere with each other on the surface of the diffraction element, and a refractive index distribution of the diffraction element is determined based on the light distribution of the second interference pattern.

7. The information recording device according to claim 5, wherein the photodetection cells are classified into two different regions, in one of which the emission points disposed at the photodetection cells have a phase of 0, and in the other of which said emission points have a phase of $\pi$, and these two different regions are disposed in an alternating manner.

8. The information recording device according to claim 5, wherein the light rays being emitted from the centers of the microscopic elements are in phase.

9. The information recording device according to claim 5, wherein the light distributions of the first and second interference patterns are calculated successively, while changing combinations of the photodetection cells serving as an origin of the emitted light, to determine an unevenness distribution of the surface of the diffraction element, the unevenness distribution is stored in a memory, the unevenness distribution is read from the memory during signal recording, and the phase of light reflected at the uneven surface is spatially modulated.

10. The information recording device according to claim 6, wherein the light distributions of the first and second interference patterns are calculated successively, while changing combinations of the photodetection cells serving as an origin of the emitted light, to determine a refractive index distribution of the diffraction element, the refractive index distribution is stored in a memory, the refractive index distribution is read from the memory during signal recording, and the phase of light transmitted through the microscopic regions is spatially modulated.

11. The information recording device according to claim 1, wherein the large number of diffracted light rays are converged by the converging element at two or more different depths within a photosensitive layer of an information recording medium.

12. The information reproducing device according to claim 2, wherein the information in the photosensitive layer is stored at two or more different depths within the photosensitive layer.

13. The information recording device according to claim 1, wherein the photosensitive layer is a photopolymer.

14. The information reproducing device of claim 2, wherein the photosensitive layer is a photopolymer.

* * * * *